May 26, 1931.     W. G. KIRCHHOFF     1,807,295
CONVEYER AND BALLER
Filed Nov. 3, 1930
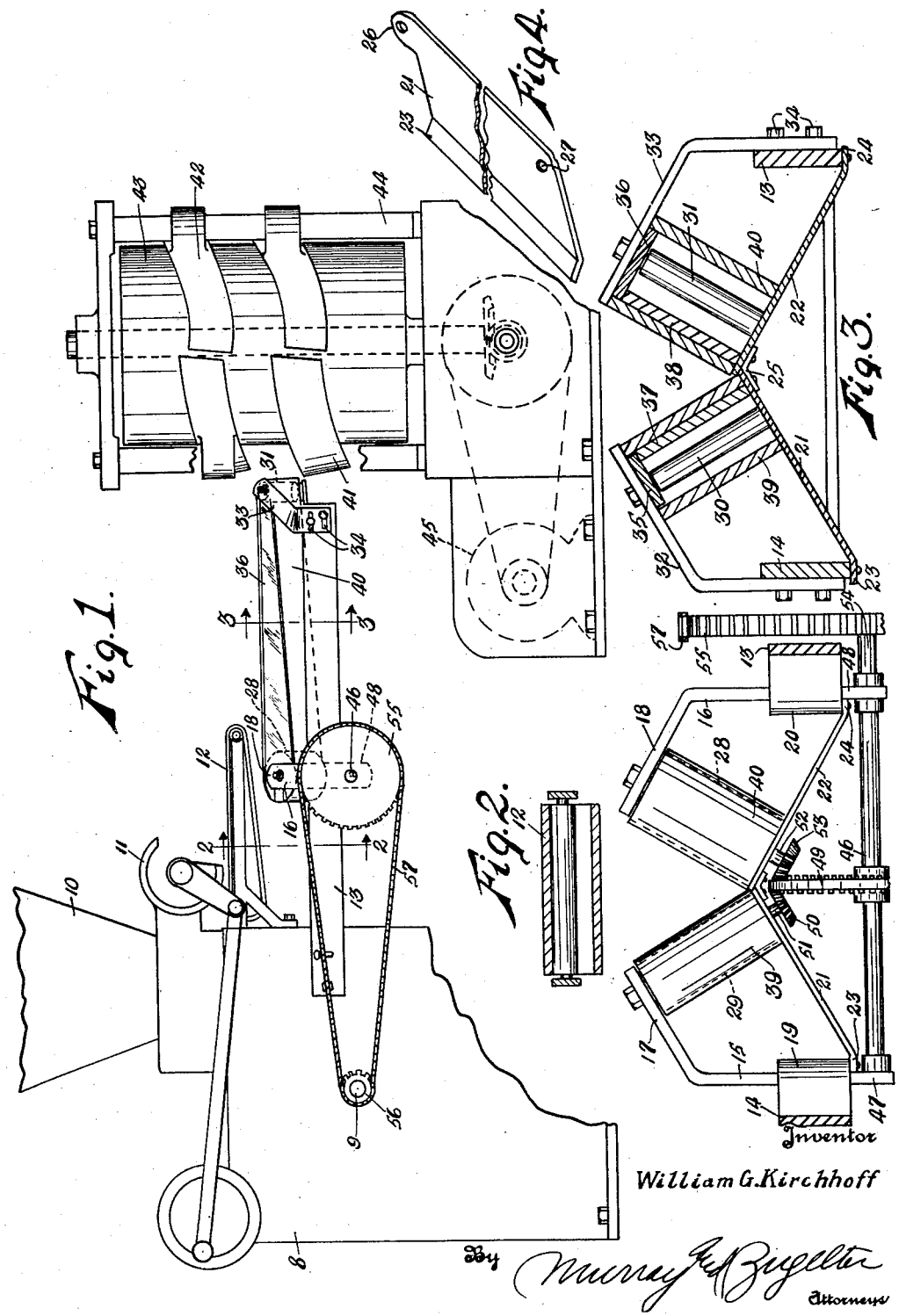
Inventor
William G. Kirchhoff Patented May 26, 1931

1,807,295

UNITED STATES PATENT OFFICE

WILLIAM G. KIRCHHOFF, OF CINCINNATI, OHIO, ASSIGNOR TO THE J. H. DAY COMPANY, OF CINCINNATI, OHIO, A CORPORATION OF OHIO

CONVEYER AND BALLER

Application filed November 3, 1930. Serial No. 493,031.

This invention relates to dough-working machinery and particularly to a combined conveying and shaping mechanism serving as the connecting medium between a dough divider and a dough baller.

An object of the invention is to provide efficient means for conveying divided masses of dough from the divider to the baller.

Another object is to provide such means, which likewise effect an initial shaping of each mass or lump of dough before transfer thereof to the baller.

A further object is the provision of such means in which the possibility of loss and of reduction of the lumps of dough is eliminated.

These and other objects are attained by the means described herein and set forth in the accompanying drawings, in which:

Fig. 1 is a side elevational view of a divider and a baller having associated therewith the means of the present invention.

Fig. 2 is a view taken on line 2—2 of Fig. 1.
Fig. 3 is a view taken on line 3—3 of Fig. 1.
Fig. 4 is a view of a detail of the invention.

It is desirable that the lumps of dough submitted to the baller be previously subjected to an initial forming process so that the shaped product, such as buns or biscuits, as turned out by the baller, may be of uniform texture and configuration. Conveyers, heretofore, have had no part in the shaping process. Moreover, they possessed disadvantages the chief of which was the possibility that the lumps of dough received upon the normally-used, flat conveyer belt might roll off in the course of movement toward the baller.

The present invention provides a combined baller and conveyer comprising a pair of moving belts disposed angularly relative to one another so as to form a dough-receiving trough V-shaped in cross section. The belts are moved at different speeds whereby a rolling action is added to the forward movement of the lumps of dough. By this means the lumps are initially formed and transferred to the baller.

With reference to the drawings: the divider 8 is of the type set forth in my patent, Number 1,591,492 and comprises a main drive shaft 9 and a hopper 10 from the bottom of which the dough is moved and subjected to the action of the dividing mechanism 11. The belt conveyer 12 receives the divided lumps of dough and deposits them in the combined conveyer and baller of the present invention. The supporting structure for the latter comprises a pair of arms 13 and 14 extending outwardly from the body of the divider 8 beneath the dividing mechanism 11 and the conveyer 12, said arms being inwardly offset as at 19 and 20. A pair of oppositely-disposed supporting brackets 15 and 16 is attached to the arms 13 and 14, forwardly of the offsets 19 and 20 and beneath conveyer 12. Brackets 15 and 16 are provided with similar inwardly and upwardly projecting portions 17 and 18. A pair of bottom plates 21 and 22 is attached to the lower edges of arms 13 and 14 being provided with lateral flanges 23 and 24 for the purpose. Plates 21 and 22 project upwardly in parallel spaced relationship with bracket portions 17 and 18 respectively, and are joined along their upper longitudinal edges by suitable means such as angle brackets 25. The outer end of each plate 21 and 22 is provided with a perforated extension 26 and the inner end with a perforation 27.

A roller 28 has its shaft 52 journaled at one end in bracket portion 18 and at the opposite end in perforation 27 in plate 22. A second roller 29 and shaft 51 is similarly mounted between portion 17 and plate 21. At the outer end of arms 13 and 14 smaller rollers 30 and 31 are journaled between a pair of brackets 32 and 33 and the perforated extensions 26. Brackets 32 and 33 are forwardly offset and are adjustable longitudinally of arms 13 and 14 as indicated at 34. A pair of top plates 35 and 36 extends between brackets 17 and 32 and brackets 18 and 33 respectively, the ends of said plates being interposed between the rollers and the associated brackets on each side of the structure. Wall plates 37 and 38 extend between top and bottom plates 21, 35 and 22, 36, respectively, along the uppermost longitudinal edges thereof. Endless belts 39 and 40 are positioned upon rollers 29, 30 and 28, 31, respectively, each belt passing over the outer face of the respective wall plates 37 and 28. A V-shaped trough with non-resilient, non-separable walls is thus formed. The trough terminates above a section 41 of the spiral ring structure 42 which cooperates with the cylinder 43 of a baller 44, said device being operated by suitable power means indicated generally at 45. The baller is of the general character set forth in Patent No. 1,302,462, to W. Bachmann.

The driving means for the conveyer and baller of the present invention comprise a shaft 46 journaled between the ends 47 and 48 of brackets 15 and 16, said ends projecting downwardly below the support arms 13 and 14. A gear 49, having teeth at the edges of both sides, is fixed upon shaft 46 intermediate the ends thereof. A bevel gear 50 is fixed upon the lower end of roller shaft 51 which projects through perforation 27 in plate 21. Gear 50 meshes with the teeth on one side of gear 49. Another bevel gear 53 is similarly fixed upon shaft 52 and meshes with the teeth on the opposite side of gear 49. The gear ratio of gears 50 and 49 is different from that of gears 53 and 49. The end 54 of shaft 46 projects outwardly beyond the support arm 13 and has keyed thereon a sprocket wheel 55. A smaller sprocket wheel 56 is fixed upon the projecting end of drive shaft 9 and said two wheels are joined by a chain 57.

Movement from drive shaft 9 is transmitted through sprocket wheel 55, gears 49, 50 and 53, to rollers 28 and 29 and the associated belts 40 and 39. The difference in speed of said belts effected by the differential gear ratio previously explained, results in a rolling or rotary movement of the lumps of dough during the time they are being carried to the baller 44. The non-yielding character of the trough walls precludes loss of the units of dough and reduction in the size thereof.

What is claimed is:

1. The combination with a dough divider, having driving means, of a combined conveyer and baller comprising supporting structure attached to the divider, two pairs of aligned rollers carried by the supporting structure, said pairs being spaced and the rollers of each pair being disposed angularly relative to one another, a pair of endless belts carried by the rollers and forming a trough V-shaped in cross section, a plate disclosed beneath and against the trough-forming portion of said belts, a gear fixed at one end of each roller of one pair, a shaft carried by the supporting structure, a gear fixed upon the shaft and meshing at differing gear ratios with the aforesaid gears, and means for driving said shaft from the driving means of the divider.

2. The combination with a dough divider of spaced support members attached to the divider and projecting outwardly beneath the dividing mechanism thereof, a pair of oppositely-disposed brackets attached to the support members and projecting above said members, the upper portions of the brackets being angularly disposed in the direction of the opposite support member, a second pair of brackets attached to the support members in spaced relation with the first pair and having upper portions disposed similarly to those of the first pair, a pair of bottom plates attached to the support members and to one another and disposed beneath the brackets in spaced parallel relationship with the angularly disposed portions thereof, a roller revolubly mounted between each bracket and the plate therebeneath, a pair of endless belts carried one each by the rollers of each support member and together forming a receiving trough V-shaped in cross section, a plate mounted beneath and against the trough-forming portion of each belt, top plates mounted above the rollers in substantial parallelism with the bottom plates, and means for moving the belts at differential speeds.

3. The combination with a dough divider having driving means, of supporting structure attached to the divider and projecting outwardly beneath the dividing mechanism thereof, opposed rollers mounted upon the supporting structure in angular divergent relationship, a pair of endless belts carried by the rollers and forming a dough-receiving trough V-shaped in cross section, means maintaining the trough-forming portions of said belts in non-yielding relationship, a gear mounted at the lower end of one of the rollers associated with each belt, a shaft carried by the supporting structure, a gear fixed upon the shaft and having teeth on each of its sides, said teeth meshing at each side of the gear and at different gear ratios with one of the roller gears, and means for driving said shaft from the divider driving means.

4. The combination with a dough divider having driving means, of a combined conveyer and baller comprising supporting structure attached to the divider, a pair of endless belts carried by said structure and together forming a trough V-shaped in cross-section, plate members attached to the supporting structure and substantially enclosing the space between the parts of the respective belts, and means disposed below the plane of the trough opening for actuating the belts from the divider driving means.

5. The combination with a dough divider having driving means, of a combined conveyer and baller comprising supporting structure attached to the divider, a pair of endless belts carried by said structure and together forming a trough V-shaped in cross-section, plate members attached to the supporting structure and substantially enclosing the space between the parts of the respective belts, and means for actuating the belts from the divider driving means.

In testimony whereof, I have hereunto subscribed my name this 27th day of October, 1930.

WILLIAM G. KIRCHHOFF.